May 26, 1970  L. P. E. CAGNIARD  3,514,693
METHOD OF SUBMARINE MAGNETOTELLURIC SURVEYING AND APPARATUS
FOR CARRYING OUT SAME

Filed June 14, 1967  2 Sheets-Sheet 1

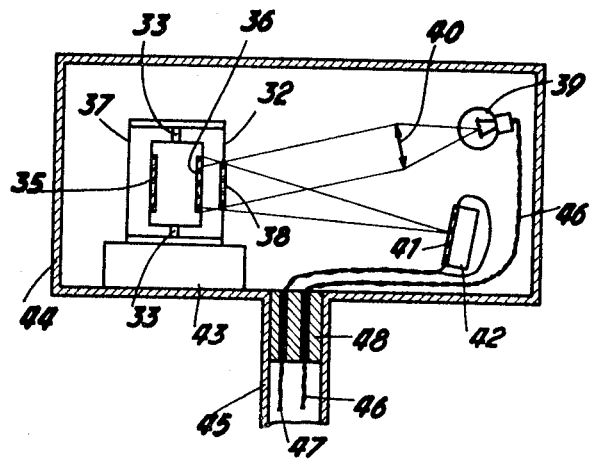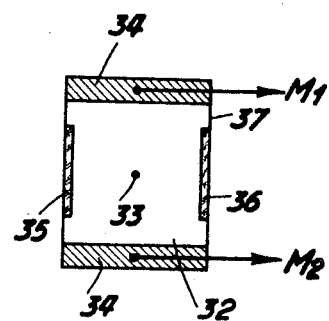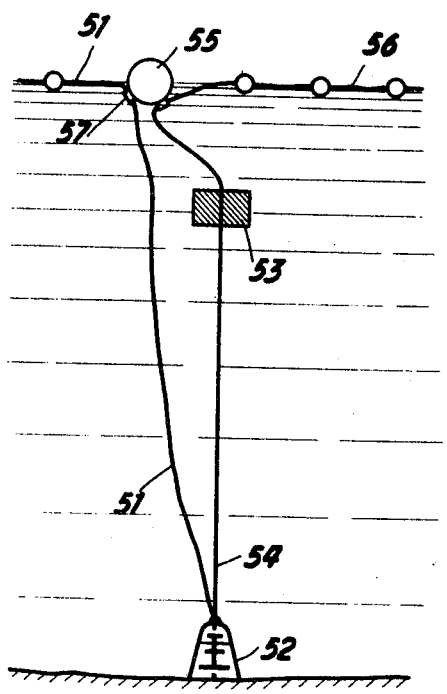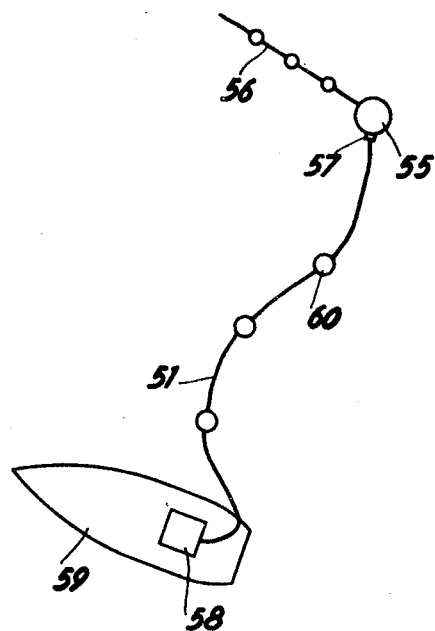

United States Patent Office

3,514,693
Patented May 26, 1970

3,514,693
METHOD OF SUBMARINE MAGNETOTELLURIC SURVEYING AND APPARATUS FOR CARRYING OUT SAME
Louis Paul Emile Cagniard, Paris, France, assignor to Centre National de la Recherche Scientifique, Paris, France
Filed June 14, 1967, Ser. No. 646,105
Claims priority, application France, June 23, 1966, 66,688
Int. Cl. G01v 3/00
U.S. Cl. 324—1
9 Claims

ABSTRACT OF THE DISCLOSURE

A method for use in submarine magnetotelluric surveying is disclosed in which measurements of the telluric and magnetic fields are made only on the sea bed, thus excluding interference due to waves, tidal currents, and the like. The method includes placing two terminal electrodes on the sea bed, separated by a distance of the order of a kilometre, placing a magnetic sensing device on the sea bed, orienting the device to sense the variations in the desired magnetic component, and recording the telluric and magnetic data produced. Also disclosed is a magnetometric means adapted to rest in a stable manner on the sea bed, comprising essentially a frame supported by weighted feet and three platforms adapted to move in relationship to each other, the magnetometer being carried on a vertical rod adapted to rotate in relation to one of the platforms. The magnetometric means is used in conjunction with a pair of telluric electrodes which are positioned on the sea bed. The magnetometer and electrodes are connected to recording means which are positioned at surface of the water.

---

The present invention relates to a method of and an apparatus for submarine magnetotelluric surveying.

The term magnetotelluric surveying of the subsoil is applied to the technique of geophysical surveying which consists in obtaining information regarding the electrical resistivity of the ground at different depths by simultaneously recording at surface level the variations of the magnetic field on the one hand and the telluric field on the other.

French Pat. No. 1,025,683 of Oct. 6, 1950 describes a method of geophysical surveying utilising these magnetotelluric phenomena. In this patent the inventor had foreseen not only the study of "normal" subsoils but also that of submarine or in general subaquatic beds. Certain practical difficulties have nevertheless arisen in the operation of the submarine process of the aforesaid patent.

In this connection it would appear to be necessary first to recall certain general principles. It is known that so-called magnetotelluric surveying is based on electromagnetic induction phenomena produced in solid ground by natural electromagnetic variations the seat and origin of which are above the ground, in the terrestrial atmosphere and ionosphere. Since the liquid medium is not immobile, since its surface is agitated by waves and swell, since its surface rises and falls depending on the time of the tide, and since the entire liquid mass is displaced by the action of currents, particularly tidal currents, in this medium it is necessary to take into account the electromotive forces, that is to say the particular electric currents and magnetic fields which are originated because of these displacements. These are electromotive forces of the so-called "cut flux" type, due to the displacement of a conductor in the terrestrial magnetic field and which do not exist in the solid medium; these electromotive forces are not considered by the theory of magnetotelluric phenomena and in practice it would even be impossible to take them into account in a more complete theory because these movements and this agitation of the marine medium are to a very large extent unknown, unforeseeable, and too complex.

In addition, independently of the foregoing considerations, when a floating telluric line ending in floating electrodes is used, as provided for in the aforesaid patent, the movements of the surface, the currents, and gusts of wind entail enormous disturbances of the actual measurement, because of the variations of the "cut flux" not through the conductive sea water but through the conductor constituting the line itself; this has the result that in practice very stringent precautions are necessary. Difficulties are also encountered in the measurement of the magnetic field existing at the surface; it is in fact required to measure the variations in respect of time of a horizontal magnetic component in an imposed fixed, invariable, and clearly defined direction. It is therefore important to stabilise the floating magnetometer with the most extreme accuracy, while freeing it of outside disturbances of the magnetic field arising from the boat or buoy carrying the magnetometer; measurement of the magnetic field either with the aid of a closed loop partly immersed in the vertical position or on land, while the telluric field is measured on the water, is very delicate to carry out and in addition not very reliable in its results.

Because of the interest aroused by magnetotelluric surveying, the inventor has continued his work in order to succeed in eliminating the disadvantages mentioned above, which are particular to submarine magnetotelluric operations. In the course of these studies it has been found that the relations existing between the horizontal components in paired orthogonal relationship of the electric and magnetic fields at a certain level in the interior of the ground give rise to the intervention exclusively of the electrical resistivities of the region of the ground situated below that level; this has the result that if the electrical and magnetic measurements are made on the actual sea bed and not at the surface, or between two waters, the magnetotelluric relations will be identical to what they would be at the bottom of the sea if it had first been possible to dry the latter. It will be realised that the difficulties raised by the method of the aforesaid patent are then radically suppressed.

In this connection the following observations should be made: by operating in the manner just indicated, not only are disturbances due to "cut flux" electromotive forces eliminated, but in addition a considerable supplementary advantage is gained. Both experiment and calculation in fact show that magnetotelluric sounding, however correctly and faultlessly it is assumed to have been made, does not supply the geologist with all the information which he expects therefrom when the surface layers are far more highly conductive than the deep layers. Now, this is precisely what happens when magnetotelluric sounding is effected at the surface of the sea with depths of only a few tens of metres, however faultless the measurements and even if they are made at the surface of an ideally immobile liquid medium. The electric conductivity of sea water, which is 100 or 1000 times as great as that of the bed, intervenes in a preponderant manner in the determination of the value of the mean resistivity up to considerable depths, amounting to several hundred metres or more. The thin superficial conductive layer short-circuits as it were the thick but resistive subjacent layers. This has the result that it becomes practically impossible to show clearly the variations of resistivity which may occur too near the bed. It is not so much the absorption of the electromagnetic waves by the sea water which is involved here. This absorption becomes really substantial when the sea is shallow only for high frequencies, higher than a few cycles or tens of cycles per second; strictly speaking, it is therefore not a physical effect of an electromagnetic screen but a mathematical phenomenon which masks the appearance of certain details in the measurements. Not only is it then necessary to resign oneself to certain gaps in the information, but in order to extend the investigation to a given depth it becomes necessary to extend the harmonic analysis of magnetotelluric data to considerably larger periods. This results in the need for a longer recording time and thence an increase in the cost of operation. It will be seen further on how the invention enables the absorption mentioned above to be overcome.

In these circumstances, the method of submarine surveying by magnetotelluric means consists fundamentally according to the invention in applying solely to the bed the measurements of the telluric and magnetic fields, excluding any measurement relating to the surface of the water or to the interior of the aquatic layer, and making arrangements to ensure that the properties of the marine medium and also the phenomena of which it is the seat do not intervene in the result of the measurements, Subsidiarily the method consists in placing the two terminal electrodes on the bed at a distance which may be between about 100 metres and a few kilometres, in accurately measuring this distance, in placing the magnetic pick-ups on the bed and orienting them so that they record the variations of the desired magnetic component, in connecting the telluric and magnetic recorders respectively to the magnetic pick-ups and to the terminal electrodes.

In order to overcome the loss of sensitivity entailed by the great reduction of the intensity of the natural electromagnetic waves of short periods as they pass through a layer of water, for example sea water, an intensive artificial electromagnetic disturbance, which may or may not be periodic, may be produced a certain distance from the magnetotelluric device.

The invention likewise relates to equipment for carrying out this method. Such equipment is essentially constituted by a surface recording station, two terminal telluric electrodes in contact with the water and resting on the bed, a telluric line constituted by two insulated lengths each connecting one of the electrodes to the surface telluric recorder, one of the lengths resting on the bed between the two electrodes, a directable magnetometer resting on the bed, means for effecting the orientation of the magnetometer, and means for recording at the surface station the variations occurring at the bed in the magnetic and telluric fields.

The terminal electrodes are for example of lead, of other metals or different electrical conductors, providing intimate electrical contact with the water. The surface of the few square decimetrés is sufficient for the electrodes. The telluric line is a well insulated cable of small section; the connections of the line and electrodes are made in such a manner as to avoid any parasitic electrical couple.

The connection between the respective terminal electrodes and the recorders is preferably made by a double or twisted insulated wire extending to a point near one of the electrodes, one of its free ends being connected to said electrode and the other to the length of line resting on the bed and connected to the second electrode.

The magnetometric means comprise for example, in a frame resting on the bed by weighted feet, a platform fixed to the frame, a second and a third platform in the plane of the first, the second being adapted to turn in relation to the first about a horizontal axis and the third being adapted to turn in relation to the second about a horizontal axis perpendicular to the pivoting axis of the second, a vertical rod mounted in the axis of the third platform and supporting at least one magnetometer, said rod being adapted to turn in relation to said platform, for example through the action of a remote-controlled hydraulic motor, and a compass mounted for free rotation on said rod and coaxially thereto, and also means for locking the magnetometers on the rod for a position marked by the compass.

One of the weighted feet of the frame may be used as terminal electrode.

Various forms of carrying out the method according to the invention are described below with reference to the accompanying drawings, in which:

FIG. 4 shows in vertical section a compass for the orientation and control of the magnetometric means, FIG. 5 illustrates on a larger scale a form of construction of the mobile equipment of the compass illustrated in FIG. 4, FIG. 6 is a diagrammatical view of a form of installation of the magnetometric frame, FIG. 7 is a sketch showing the surface installation.

Figure 1:
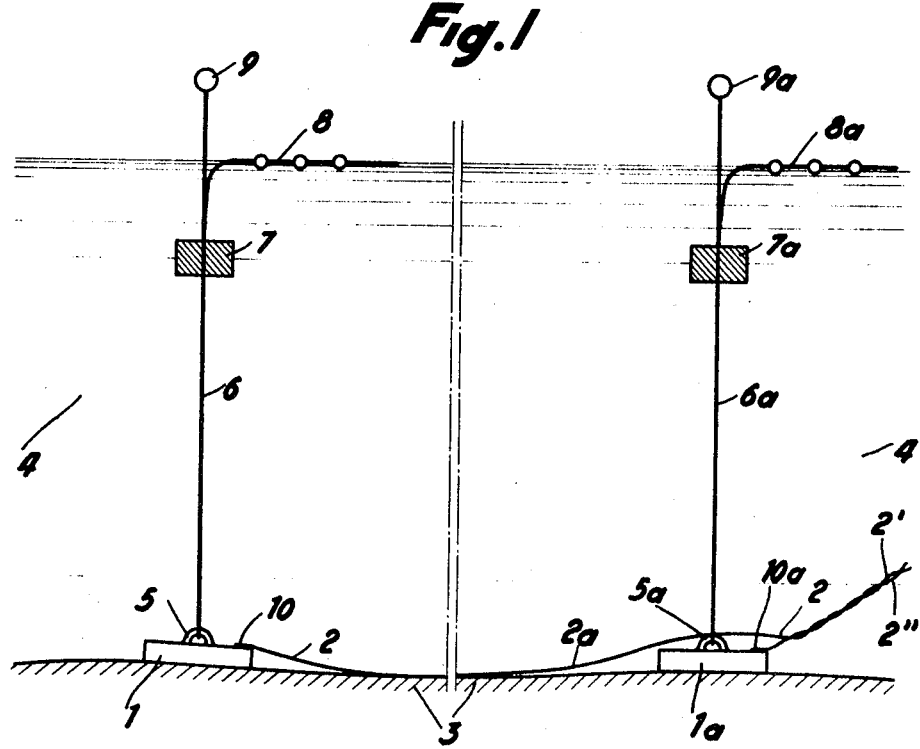
FIG. 1 illustrates the terminal telluric electrodes disposed in accordance with the invention.

There will be described in succession the telluric and magnetometric means used in accordance with the invention, and also the methods which are utilisable for correctly placing them in position and operating them. The terminal electrodes 1, 1a of the telluric line 2, composed of two insulated copper wires of small section (FIG. 1), are for example of lead. They rest on the bottom 3 without it being necessary to make good contact or even any direct contact at all between them and the ground, but ensuring that good electrical contact is made between the electrode 1, 1a and the water 4. For the purpose of locating the electrodes and, once they are in place, determining their position, their distance, and the direction of the telluric line 2 which they define, they are attached at 5, 5a, to one end of a strong, light rope 6, 6a, for example of nylon; in order to ensure that this rope will extend substantially vertically in the water from the bed to the surface it is provided with bodies 7, 7a which are lighter than water (for example of cork or composed of hollow bodies, etc.). The rope 6, 6a, which has a greater length than the depth of the water, may float on the surface at its terminal portion to the extent of its excess length 8, 8a, thus making it possible to mark, to locate, and to recover the electrode and the telluric line once the measurement has been completed. In order to facilitate the location of the electrode a balloon 9, 9a may be attached to the rope 6 and rise a few metres above the water. The two electrodes are at a distance of a few hundred metres, or even one kilometre or still more.

The connections between the telluric line 2 and the lead of the electrodes 1, 1a are made at 10, 10a, avoiding any contact between the water and the copper of the telluric line, in order not to set up a parasitic electric couple. The portion 2a of the line starting from the electrode 1 simply rests on the bed; it is not necessary that this portion of the line should be accurately rectilinear, since the telluric measurement entails in practice only the distance of the terminal electrodes 1 and 1a. In order to prevent disturbance of the telluric measurement, it is essential that the two return conductor wires 2'–2" of the telluric line 2 between the bed and the surface should be side by side or twisted together so that the cut flux electromotive forces produced in the conductors by their displacements and their agitation should oppose and neutralise one another. In the example, this double conductor wire is attached mechanically to the electrode 1a; one of the two conductors 2' is connected electrically directly to said electrode at 10a and the end of the other conductor 2" is connected before immersion of the second electrode 1 to the end of the portion 2a of the telluric line, coming from the first electrode 1.

The distance between the electrodes 1 and 1a must be known to within a few hundredths; in order to determine this distance, the position of each electrode may be located separately for example by means of the radiolocation system available in the boat laying the electrodes. It is also possible to evaluate this distance by optical telemetry applied to the buoys or signal balloons or by any other conventional method. Another indirect possibility is the measurement of the propagation time necessary for an acoustic wave to travel the distance from one electrode to the other; to this end a small explosive charge in the immediate proximity of one of the electrodes is for example detonated from the boat carying the recording equipment, and the moment of the explosion is recorded, while a hydrophone (marine seismograph) placed against the second electrode records the moment of arrival of the sound wave. The corresponding time makes it possible to determine the distance from the known speed of propagation of sound in water.

Figure 2:
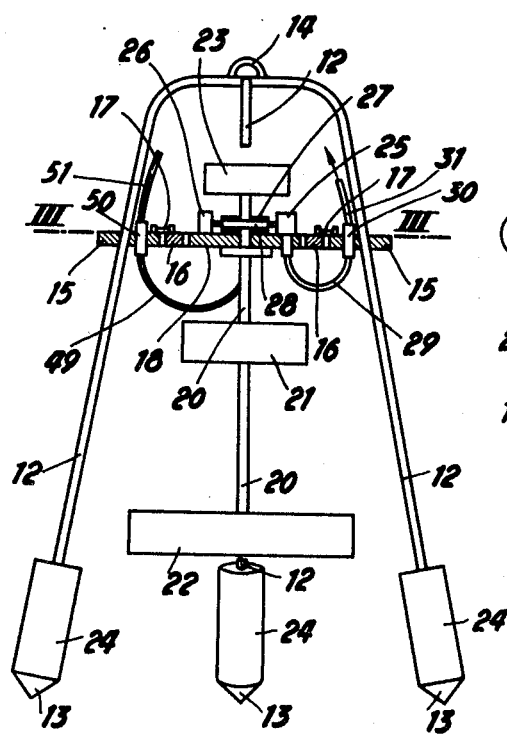
FIG. 2 illustrates diagrammatically the submersible frame carrying the magnetometers and associated devices.
Figure 3:
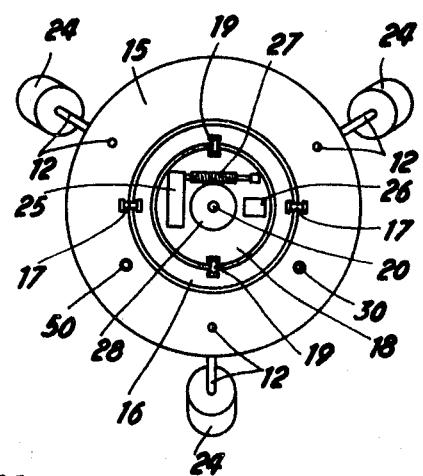
FIG. 3 is a view in section on a larger scale on the line III—III in FIG. 2.

The submerged magnetometric device (FIGS. 2 and 3) comprises a strong, rigid metal frame 12 made of an amagnetic, incorrodible metal resting by means of three feet 13 on the bed. Braces (not illustrated) provide the frame with the necessary rigidity. A trellis or a net may be provided around the frame in order to avoid seaweed or to keep fish away. At its top the frame is provided with a ring 14 permitting the fastening of a strong, light rope, for example of nylon, serving for suspension, immersion, and raising. This suspension cable is of the same construction as the suspension cable of the telluric electrodes and it is provided with suitable supporting devices having lower density than that of water. Its free end floats on the surface. It may be provided with a marker balloon.

The submerged frame 12 is provided half-way up with a hollowed horizontal platform 15 integral with said frame. In the central cavity of this fixed platform a second platform 16, likewise provided with a cavity, is adapted to turn in relation to the first platform about a horizontal axis 17, 17. A third, central platform 18 is likewise adapted to turn in relation to the second about a horizontal axis 19, 19 connected to the second platform, perpendicularly to the first axis. In other words, the central platform is suspended on the frame by a so-called cardan joint.

In the axis of the central platform, perpendicularly to its plane, there is mounted a very rigid rod, preferably a metal tube, intended to support the magnetometer or magnetometers 21, 22 and also the means 23 controlling orientation. All these devices secured to the central rod are enclosed inside watertight amagnetic casings withstanding marine pressure. They are spaced apart along the rod, some above the platform and others below, so as to be sufficiently far apart to prevent them from disturbing one another. The centre of gravity of the movable unit is as low as possible, while the Archimedean thrust centre is on the contrary as high as possible, thus the rod spontaneously assumes a practically vertical position and the magnetometers are automatically in a suitable position to be able to record the variations of a horizontal component. The feet 13 of the frame 12 can be provided with cylinders 24 or with lead plates, in order to ensure stabile seating; these plates or cylinders 24 may also enable the second telluric electrode 1a to be dispensed with.

In order to be able to record the variations of the desired magnetic component, depending on the orientation selected, the vertical axial rod carrying the magnetometers must be able to rotate about its axis in relation to the central platform 18, which for this purpose carries a small motor 25 which in turn is fixed with a counterweight 26 for mechanical balancing. The motor 25 drives rotationally a crown 28 solid to the central rod 20 with a very high reduction ratio, for example with the aid of a helicoidal worm 27. The rotation of this rod is limited to one complete revolution, or for the sake of greater convenience to a few degrees more than a complete revolution, with the aid of two stops (not illustrated).

As in the example illustrated, it is very advantageous for the motor 25 to be a small hydraulic motor, which may be entirely made of non-magnetic materials; a flexible pipe 29 connects the motor to a metal nozzle 30 secured on the fixed platform 15. From the other end of the nozzle 30 another pipe 31 is connected which at the surface leads to a small hand pump. A few strokes of the pump are then sufficient to obtain rapidly the desired orientation, as will be seen further on.

Instead of a hydraulic motor it is also possible to use any other type of motor, particularly an electric motor, provided that it is at a sufficient distance from the magnetometers to ensure that the magnetic materials which are necessarily used for its construction do not seriously disturb the magnetic field where the magnetometers are installed.

In the example described, the desired orientation is verified and obtained by means of a strong, sensitive compass (FIGS. 4 and 5). The actual compass is in the form of a light rectangular prism 32, which may be hollow, and which is movable about a vertical shaft 33, 33 mounted on pivots. Two of the opposite vertical faces 34 are occupied by identical rectangular plates magnetised horizontally in the direction of the width. Their magnetic moments are identical and in the same direction and are represented in FIG. 5 by the vectors M1 and M2. The other two vertical faces of the prism are occupied by two identical plane mirrors 35 and 36. Only the mirror 36 is used to reflect a light beam. The mirror 35 serves only to ensure symmetry and balancing. There is in fact a danger that during operations the compass may be subjected to particularly severe shocks. It is thus convenient for the prismatic equipment to be submerged in a transparent liquid having a density such that the Archimedean thrust exactly balances the weight. This has the effect that the centre of gravity coincides with the centre of hydrostatic thrust. The compass is enclosed in a watertight casing 37 provided in front of the mirror 36 with a transparent glass pane 38. An electric bulb 39 placed in front of the lens 40 transmits a beam of light to the mirror 36 so as to form on the slit 41 of a differential photosensitive cell 42 an image of the filament of the lamp 39. The difference in potential at the terminals of the photoelectric cell is cancelled by changing direction at the moment when the two areas are illuminated equally.

The compass and its accessories are securely fixed on a movable plate 43 housed inside a box 44 the bolted side plates of which have a sealed joint withstanding heavy marine pressures. A hollow cylindrical rod 45 enables the wires 46 for the bulb and 47 for the cell to be brought out through the watertight insulating joint 48. Finally, the rod 45 is inserted into the top end of the rod 20 (FIGS. 2 and 3), occupying there the position 23 indicated in FIG. 2. The Archimedean thrust applied to the box is advantageously greater than the weight of the latter.

The box containing the compass, together with its tail, is adapted to turn freely in relation to the central rod. A device of any suitable known type enables the angle of rotation to be indicated on a graduation and enables the rotation to be locked at the desired value. The necessary amplitude of this rotation extends from −90° to +90°, but it is advantageous to allow an additional latitude of a few degrees in order to avoid the risk of sometimes having to operate at the end of the stroke.

The method of utilising the compass is then as follows:

During preliminary adjustment on land, the following conditions are complied with: the zero on the graduation is brought opposite the reference mark when the potential difference at the terminals of the cell is zero; in addition, the magnetometers are adjusted in azimuth on the central rod so that they are then in a suitable position for recording the variations of the magnetic north-south component.

This being so, if the box containing the compass is rotated by $n$ degrees in the trigonometrical direction in relation to the rod, if the rotation is locked and marked on said graduation $n$, when the magnetometer is at the sea bed it will be sufficient to give a few strokes to the hydraulic pump to bring back to zero the potential difference at the terminals of the cell and to be assured in this manner that at the sea bed the magnetometers are in the desired position for recording exactly the variations of the horizontal magnetic component the azimuth of which, relative to magnetic north, is $n°$ counted towards the west.

The magnetometers 21 and 22 and also the equipment for recording the magnetic and telluric variations may be of any known type which are used or can be used for terrestrian magnetotelluric surveying. For example, for the study of rapid variations of a period less than 0.1 or 1 second, use is advantageously made of inductive windings without cores, with ferrite cores or cores of alloys of high magnetic permeability. Having no moving parts, these devices are extremely strong. For longer periods, up to several tens of minutes, it is possible to use, as is done on land, magnetometers having a moving magnet, particularly a Jolivet magnetometer, the moving part of which is immersed in a liquid in order to balance the weight and the Archimedean thrust, which makes it particularly strong and able to withstand the most violent shocks. This magnetometer is made and marketed by the firm M.N.O.P. (Mechanique Navale et Optique de Precision, 71 bis Quai du Docteur Dervaux, Asnieres, Hauts-de-Seine). In all cases, the connection wires of the various devices secured to the central rod 20 are taken inside said rod, thus providing them with mechanical protection, at a point as close as possible to the centre of the axial platform 18. They pass out in the form of a flexible bundle and are then connected to a junction piece 50 secured to the fixed platform 15. To this junction connection 50 there is connected the multi-conductor cable 51 connected to the surface equipment.

It has already been indicated that the lead masses 24 fastened to the feet of the magnetometer support frame 12 may serve as telluric electrodes. In cases where it is desired to operate simultaneously with two telluric lines at right angles, in order to effect what is called a "cross" magnetotelluric sounding, it would be possible to install on the same frame not only two electrodes, one for each of the lines, but also a double system of crossed magnetometers.

In FIG. 6 there is illustrated a possible arrangement of the frame 52 submerged on the sea bed, with its suspension cable 54 held vertical by the submerged mass 53 of low density. A light buoy 55 floats on the water and is secured to the floating excess portion 56 of the suspension cable. In the example this floating buoy is used as relay for the purpose of fastening thereto the end of the pipe controlling the hydraulic motor and for connecting the bundle 51 of electric cables to a junction plug 57. The multi-conductor cable leading to the recorders 58 is connected to the junction plug 57.

The utilisation of a relay buoy of this type offers numerous advantages; if the sea is not sufficiently deep, the presence of a boat above the magnetometers is a cause of substantial disturbances to the recordings, although this presence does not seriously disturb the equilibrium of the submerged compass. The orientation of the magnetometers can thus be effected without disadvantage from the boat, which will be called the "main boat" which effects the immersion of the magnetometers, while operating vertically in line with the magnetometers, and it is not necessary to provide a disproportionate length of pipe for the control of the hydraulic motor. On the other hand, the boat 59 carrying the recorders 58 may be required to move to a distance of several hundred metres from the floating buoy 55. It is then necessary to unwind on the surface of the sea a long cable 51, held rather loose and supported from point to point by a few floats 60. In the event of sudden bad weather occurring and making it necessary to interrupt operations, it is sufficient to disconnect the plug 57 and to leave the equipment submerged in position until more favourable meteorological conditions return.

In the technique followed at present in France, the recordings are normally made on magnetic tape, after suitable amplification and filtering. The short periods are sometimes recorded directly in the form of curves and very long periods on perforated tape, in digital form. In any case, the entire equipment, which on land is accommodated in a small van, can be installed without difficulty on an escort boat of very small tonnage, or "measuring boat," the only duty of which is to take up position near the submerged equipment for the few hours of recording which are necessary. It should be observed that the smaller the boat, the less it will disturb the measurements and the easier it becomes to approach the equipment and to reduce the length of cable connecting it to the relay buoy 55.

The main boat, which has a larger tonnage, has the task of placing in position and recovering the measuring devices while recordings are being made on the devices in position.

Another important duty may be assigned to the main boat. It is known that the recording of rapid magnetic and telluric variations of short periods, of the order of a tenth or hundredth, or even of a few thousandths of a second is particularly useful for determining the resistivity of the surface layers of the submarine ground, and consequently for good interpretation of magnetotelluric sounding.

The amplitude of these natural variations, which is sometimes only just sufficient in terrestrian surveying, is further greatly weakened at the bottom of the sea. It is then necessary to make up for the lack of intensity of the natural phenomenon by creating a sufficiently intensive artificial disturbance a few kilometres from the submerged measuring device. Any means of creating an electromagnetic disturbance of this type, whether periodical or not, whether sinusoidal or not, modulated or not, regular or irregular, may be used. For example, when the operators of the measuring boat so request, the main boat, without needing to be stationary, may release a cable, floating or otherwise, ending in an electrode or a loop, such as those used in magnetic mine sweeping, but of much smaller dimensions and section, and to pass into said cable for a few moments an alternating current of given frequency, the intensity of which may, to give some indication, be of the order of 1 ampere. For the same purpose it is also possible for a winding, which may or may not be provided with a core having high magnetic permeability, to be floated or submerged as close as possible to the surface, an alternating current being passed into said winding. The essential feature is that the artificial disturbance should be produced sufficiently far from the measuring device to ensure that the nappes of artificial telluric current should within the range of the measuring device have sufficient uniformity to behave there like natural telluric nappes.

The method according to the invention may obviously be modified in many ways, and numerous changes may be made to the devices described and also to their combinations without thereby departing from the general scope of the invention. Thus, among other things, the relay buoy may be replaced by or associated with a larger fixed buoy anchored to or laid on the bed, in which automonous automatic recording equipment would be installed. It could also be envisaged that said buoy or the measuring boat would not have the task of making the recordings but only that of radiotransmission of the magnetic and telluric variations picked up at the bottom. These signals would then be received and recorded on the main boat or even on land. The organisation of the work may and must vary from one particular case to another.

It would likewise not be a departure from the scope of the invention to utilise a submarine or any other surface or submarine diving vehicle to carry out any particular operation which in the foregoing description has been attributed to a surface boat of conventional type.

What is claimed is:

1. An apparatus for submarine magnetotelluric surveying which includes magnetic and telluric recording means at a water surface over a bed, the improvement comprising, in combination:
    (a) at least first and second terminal telluric electrodes in contact with the water and at rest on the bed;
    (b) a telluric line having at least two separate conductive portions starting from the first electrode, one end of each portion being connected to the telluric recording means and the other end of each portion being respectively attached to separate ones of the electrodes, a part of the portion of said line which is attached to the second electrode resting on the bed between said second electrode and said first electrode;
    (c) magnetometric means having support means thereof resting on said bed and carrying a fixed support means, said fixed support means carrying a first movable support means mounted for rotation about a first relatively horizontal axis, said first movable support means carrying a second movable support means mounted for rotation about a second relatively horizontal axis perpendicular to said first horizontal axis, a vertical rod carried by said second movable support means, said rod being rotatable about an axis perpendicular to said second relatively horizontal axis and carrying a magnetometer means;
    (d) means for giving a desired compass orientation to said magnetometer means; and
    (e) means for connecting said magnetometer means to the surface magnetic recording means.

2. The apparatus of claim 1, wherein the telluric line comprises a line having two insulated conductive portions side by side.

3. The apparatus of claim 1, wherein the telluric line comprises a double wire having two insulated portions twisted together.

4. The apparatus of claim 1, wherein the electrodes are of lead.

5. The apparatus of claim 1, wherein the support means which rests on said bed comprises a frame having weighted feet resting on the bed, said fixed support comprises a first platform fixed to the frame, said first and said second support means comprise respectively a second and third platform situated in the plane of the first platform and including means permitting said second and third platform to turn, the second in relation to the first about said first relatively horizontal axis and the third in relation to the second about said second relatively horizontal axis perpendicular to said first relatively horizontal axis, said vertical rod being mounted in the axis of the third platform and supporting at least one magnetometer comprising said magnetometer means, said rod being rotatable in relation to said third platform, the means for giving a desired compass orientation comprise a compass mounted for free rotation on said rod coaxially to the latter, and means for locking the at least one magnetometer on the rod for a given position determined by the compass.

6. The apparatus of claim 5, wherein said magnetometric means includes a hydraulic motor and means for the remote control of said motor from the surface to turn the compass.

7. The apparatus of claim 1, wherein one of the telluric electrodes is constituted by one of the support members of the magnetometric means.

8. The apparatus of claim 1 wherein the magnetometer means comprise two crossed magnetometers.

9. In an apparatus for submarine magnetotelluric surveying which includes magnetic and telluric recording means at a water surface over a bed, the improvement comprising, in combination:
    (a) first and second telluric electrodes in contact with the water and resting on the bed;
    (b) a telluric line having at least two separate conductive portions twisted together starting from said first electrode, one end of each portion being connected to the telluric recording means and the other end of each portion being respectively attached to separate ones of the electrodes, a part of the portion of said line attached to said second electrode resting on the bed between said first electrode and said second electrode;
    (c) support means carrying at least one magnetometer resting on the bed;
    (d) means allowing rotation of a portion of said support means for orienting said magnetometer about two mutually perpendicular relatively horizontal axes;
    (e) means for giving a desired compass orientation to said at least one magnetometer; and
    (f) means for connecting said magnetometer to the surface magnetic recording means.

References Cited

UNITED STATES PATENTS

| 736,432 | 8/1903 | Owens | 324—1 XR |
|---|---|---|---|
| 948,424 | 2/1910 | Long | 324—1 XR |
| 2,677,801 | 5/1954 | Cagniard | 324—1 |
| 2,872,638 | 2/1959 | Jones | 324—9 XR |
| 3,338,059 | 8/1967 | Tittle | 324—3 XR |

OTHER REFERENCES

Parnum, D. H.: Underwater Measurements of Magnetic Field, Institute of Electrical Engineers, vol. 93, Part I, No. 70, October 1946, pp. 435–446.

Cagniard, Louis: Basic Theory of the Magneto-Telluric Method of Geophysical Prospecting, Geophysics, pp. 605–635, July 1953.

GERARD R. STRECKER, Primary Examiner

U.S. Cl. X.R.

324—8, 9